United States Patent
Aronov et al.

(10) Patent No.: US 12,142,724 B2
(45) Date of Patent: Nov. 12, 2024

(54) MULTI-ELECTROLYTE BATTERY

(71) Applicant: STOREDOT LTD., Herzeliya (IL)

(72) Inventors: Daniel Aronov, Netanya (IL); Assaf Zehavi, Haifa (IL); Eran Sella, Tel Aviv (IL)

(73) Assignee: STOREDOT LTD., Herzeliya (IL)

( * ) Notice: Subject to any disclaimer, the term of this patent is extended or adjusted under 35 U.S.C. 154(b) by 84 days.

(21) Appl. No.: 17/302,262

(22) Filed: Apr. 28, 2021

(65) Prior Publication Data
US 2021/0336292 A1    Oct. 28, 2021

Related U.S. Application Data

(60) Provisional application No. 63/016,300, filed on Apr. 28, 2020.

(51) Int. Cl.
| | |
|---|---|
| *H01M 10/0562* | (2010.01) |
| *H01M 10/0566* | (2010.01) |
| *H01M 10/0585* | (2010.01) |
| *H01M 10/0587* | (2010.01) |
| *H01M 50/183* | (2021.01) |
| *H01M 10/0565* | (2010.01) |

(52) U.S. Cl.
CPC ... *H01M 10/0562* (2013.01); *H01M 10/0566* (2013.01); *H01M 10/0585* (2013.01); *H01M 10/0587* (2013.01); *H01M 50/183* (2021.01); *H01M 10/0565* (2013.01)

(58) Field of Classification Search
CPC ......... H01M 10/0562; H01M 10/0566; H01M 10/0585; H01M 10/0587; H01M 50/183; H01M 10/0565
See application file for complete search history.

(56) References Cited

U.S. PATENT DOCUMENTS

| | | | |
|---|---|---|---|
| 2015/0162641 A1* | 6/2015 | Visco | H01M 10/052 429/246 |
| 2019/0089011 A1* | 3/2019 | Seki | H01M 50/209 |

FOREIGN PATENT DOCUMENTS

| | | | |
|---|---|---|---|
| CN | 108807810 A | * 11/2018 | ............ H01M 50/46 |

OTHER PUBLICATIONS

Machine translation of CN-108807810-A. Obtained from PE2E. (Year: 2018).*

* cited by examiner

*Primary Examiner* — Jimmy Vo
(74) *Attorney, Agent, or Firm* — Reches Patents (57) ABSTRACT

A multi-electrolyte battery, that may include an anode, a cathode, a solid electrolyte positioned between the anode and the cathode, current carriers that comprises an anode current carrier and a cathode current carrier; and at least one other electrolyte. The anode current carrier and the cathode current carrier comprise two external portions that extends outside the anode. The solid electrolyte is sealingly coupled to the two external portions of at least one of the current carriers to define at least one sealed electrolyte, the at least one sealed electrolyte belongs to the at least one other electrolyte.

24 Claims, 10 Drawing Sheets

MULTI-ELECTROLYTE BATTERY

CROSS REFERENCE

This application claims priority from U.S. provisional patent 63/016,300 filing date Apr. 28, 2020, which is incorporated herein by reference.

BACKGROUND

A battery typically consists of three main components: the anode (negative electrode), the electrolyte, and the cathode (positive electrode). During charge, lithium ions migrate through the liquid electrolyte from the cathode to the anode. A polymer-based separator electrically isolates the cathode from the anode. The liquid electrolyte is typically $LiPF_6$ dissolved in a mixture of organic solvents. The performance of the battery is, in part, determined by the performance of the electrolyte. Specifically, it is desirable for the electrolyte to have a very high ionic conductivity to facilitate rapid shuttling of lithium ions between the electrodes to maximize power delivery, while having a very low electrical conductivity to limit self-discharge and prolong shelf-life. Additionally, the ability of the electrolyte to perform effectively over a wide temperature range is crucial for many applications. Liquid electrolytes meet all of these criteria. Moreover, such electrolyte property allows battery to be fast charged and discharged.

However, there are serious safety concerns regarding the use of liquid electrolytes. The use of organic-based solvents often makes liquid electrolytes highly volatile under extreme operating conditions such as high temperatures, high charge-discharge rates, puncturing, etc.

Another key aspect of battery operation is the amount of lithium that can be stored in the electrodes. The more lithium the electrodes can store and release, the higher the capacity and the more energy that can be extracted during operation. However, the liquid electrolyte can react with the surfaces of the cathode and anode, forming a solid electrolyte interfacial layer, which can protect the electrode but also adversely affect electrode performance by increasing resistance to charge flow during cycling. This can lead to fading of the battery, which means the capacity of the battery drops as the number of charge and discharge cycles decreasing. These secondary reactions can also lead to decreased battery life with increasing temperatures.

Main advantages: high ionic conductivity; low interfacial resistance; wide operating temperatures.

Main disadvantages: safety concerns, due to high volatility; continuous SEI formation, especially for metallic or metalloid-based anodes (i.e. Si), resulting in resistance increase.

Solid electrolyte cell.

To help circumvent these issues, a solid-state electrolyte has been developed.

Recently, solid electrolyte materials with high ionic conductivity, comparable to typical liquid electrolytes have been introduced. Additionally, such materials are known to have very high electrical resistivity, good temperature stability, and excellent stability in contact with electrode materials, including metallic lithium.

Moreover, because solid-state batteries contain no flammable material and cannot produce hydrogen gas internally, there is a dramatic improvement in operational safety. The inert nature of solid state electrolytes also allows for the use of higher-voltage cathode materials, which improves energy density. Despite the opportunity to use high-voltage cathodes, there are still challenges with their use.

Likewise, solid-electrolyte interfacial layer formation and other secondary reactions during operation are reduced or even avoided in solid state batteries, which results in very low self-discharge rates and allows for multiyear storage with minimal loss of power. Additionally, prior work has shown that solid-state batteries can potentially cycle 10-100 times longer without fading than can liquid batteries.

However, solid state electrolyte technology suffers from high interfacial impedance that actually will limit the charging and discharging rates of the cell.

Moreover, in case of high morphological changes in the anode, i.e. Si, this resistance may result in lower achievable capacity even in slow rates. In addition, integrating the solid state electrolyte in a porous layer is highly challenging, especially if required in both sides (and then powder sintering or sputtering is impossible).

There is a growing need to provide a battery which will be safer and enable fast ion passage therethrough.

SUMMARY

There may be provide a multi-electrolyte battery and a method thereof.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a battery capable of executing the method and/or to a battery manufactured by the method.

Any reference in the specification to a battery should be applied mutatis mutandis to a method for operating the battery and/or to a method for manufacturing the battery.

Any combination of any module or unit listed in any of the figures, any part of the specification and/or any claims may be provided.

Any combination of any steps of any method illustrated in the specification and/or drawings may be provided.

Any combination of any subject matter of any of claims may be provided.

There is provided a multi-electrolyte battery that may include a solid electrolyte and one or more other electrolytes. The one or more other electrolytes may include at least one sealed electrolytes. The one or more other electrolytes may be liquid or solid, and/or sealed or unsealed.

The sealing may be done by using at least the solid electrolyte that extends outside the anode and the cathode. The sealing is done by at points that are external to the anode—for example using a heat sensitive resin—thereby providing a simple and cost effective manufacturing process. The heat sensitive resin may include one or more materials—that may or may not be arranged in one or more layers. For example—there may be provided three layers—whereas the top and bottom layers (molten resin) are made of polypropylene (for example having a melting point of about 170° C.), and the middle layer (backbone) is made of Polyethylene naphthalate (for example having a melting point of about 270° C.). Any number of layers may be provided. Other materials having other and/or the same melting points may be provided. The thickness of the layer may be, for example, in the micron range—for example PEN thickness about 12 micron, PP thickness between 30 and 44 micron. Other thickness values may be provided.

The multi-electrolyte battery may exhibit an increased safety, may use separate electrolytes for the anode and the cathode—thereby may reduce or even eliminate SEI layer formation, abuse tolerant (overcharge insensitive), etc, may have an increased thermal stability, may eliminate interfacial resistance, may exhibit a high electrical resistance, may exhibit a high ionic conductivity, may use a ceramic separator that inhibits dendrite growth, and may exhibit an increased energy density, and increased volumetric and/or gravimetric specific energy (less inactive materials).

FIGS. 1-6 illustrate various example of multi-electrolyte batteries 11, 12, 13, 14, 15, 16, 17, 18, 19, 11', 12', 13' and 13".

Figure 1:
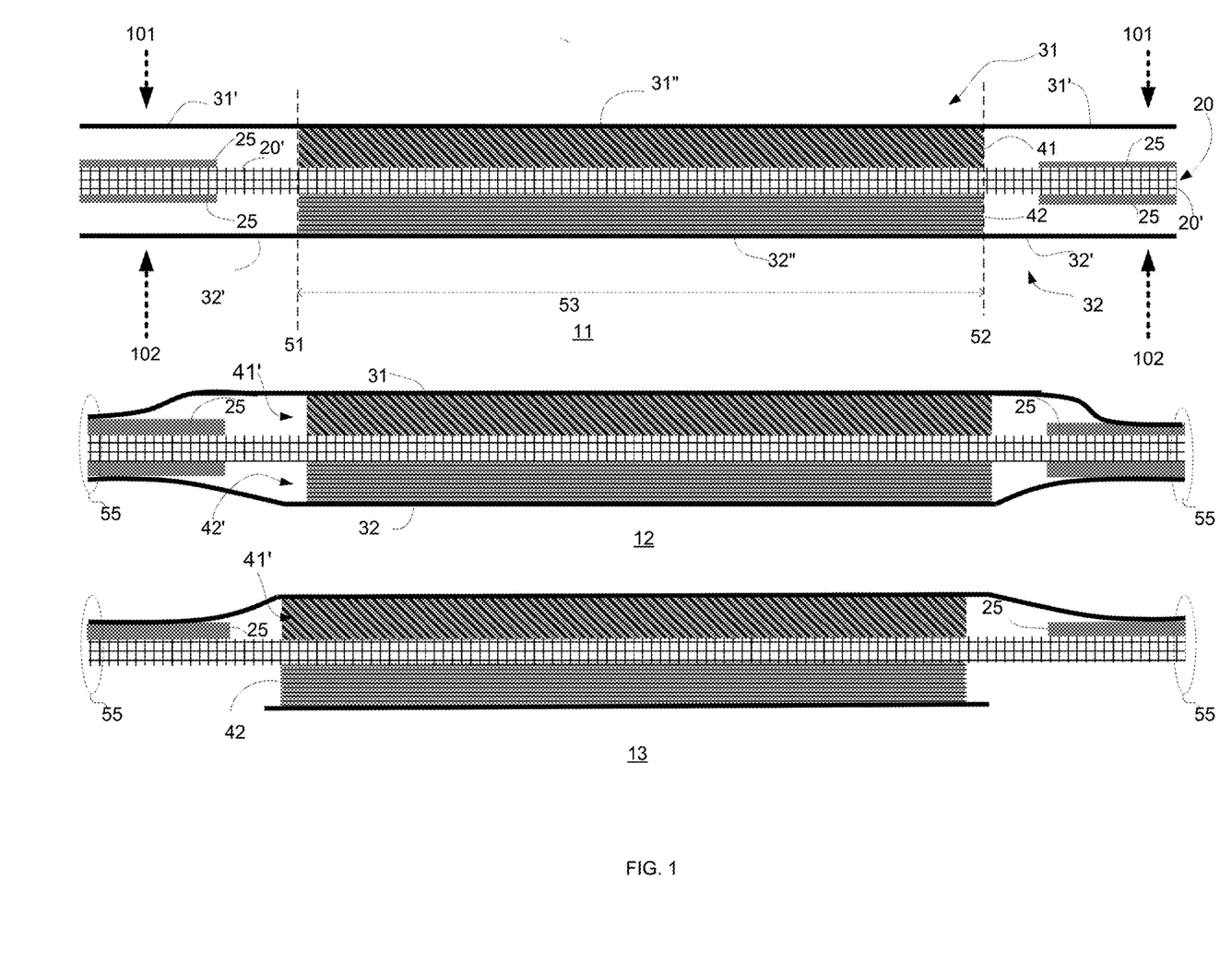
FIG. 1 illustrates examples of multi-electrolyte batteries.

Multi-electrolyte battery 11 of FIG. 1 is illustrated before the sealing coupling are formed and multi-electrolyte batteries 12 and 13 of FIG. 1 are shown after sealing coupling are formed.

Multi-electrolyte battery 11 includes anode and anode electrolyte (collectively denoted "anode 41"), anode current collector 31, cathode and cathode electrolyte (collectively denoted "cathode 42"), cathode current collector 32, solid electrolyte 20, and heat responsive resin 25. The multi-electrolyte battery has main body 53 that is delimited by virtual right line 52 (corresponds to a first side of the anode and the cathode) and virtual left line 51 (corresponds to a second side of the anode and the cathode). External portions 31' of the anode current collector 31, external portions 32' of the cathode current collector, and external portions 20' of the solid electrolyte extend outside the main body.

Arrows 101 and 102 illustrate the heat and pressure applied on the external portions of the anode current collector and the cathode current collector to provide sealing couplings 55 of multi-electrolyte battery 12.

In multi-electrolyte battery 12 both the anode and the cathode are sealed—to provide a sealed anode 41' and a sealed cathode 42'. The sealing of the anode (thereby forming a sealed anode electrolyte) is formed by the sealed coupling between a top surface of the solid electrolyte 20, and the external portions 31' of the anode current collector, the sealed coupling is facilitated by the heat responsive resin 25.

The sealing of the cathode (thereby forming a sealed cathode electrolyte) is formed by the sealed coupling between a top surface of the solid electrolyte 20, and the external portions 32' of the cathode current collector, the sealed coupling is facilitated by the heat responsive resin 25.

In multi-electrolyte battery 13, only the anode is sealed—while the cathode is unsealed.

FIGS. 2, 3, 4, and 5 illustrate multi-electrolyte batteries 14, 15, 16, 17, 18, 19, 11' and 12' that include two segments 60(1) and 60(2). The two segments include (in total) two anodes and two cathodes, between two and four current collectors, two solid electrolytes, and heat responsive resin 25.

The different multi-electrolyte batteries illustrate two or more different order of elements.

The different multi-electrolyte batteries illustrate different combinations of sealed and/or unsealed electrodes (and corresponding electrolytes).

Figure 2:
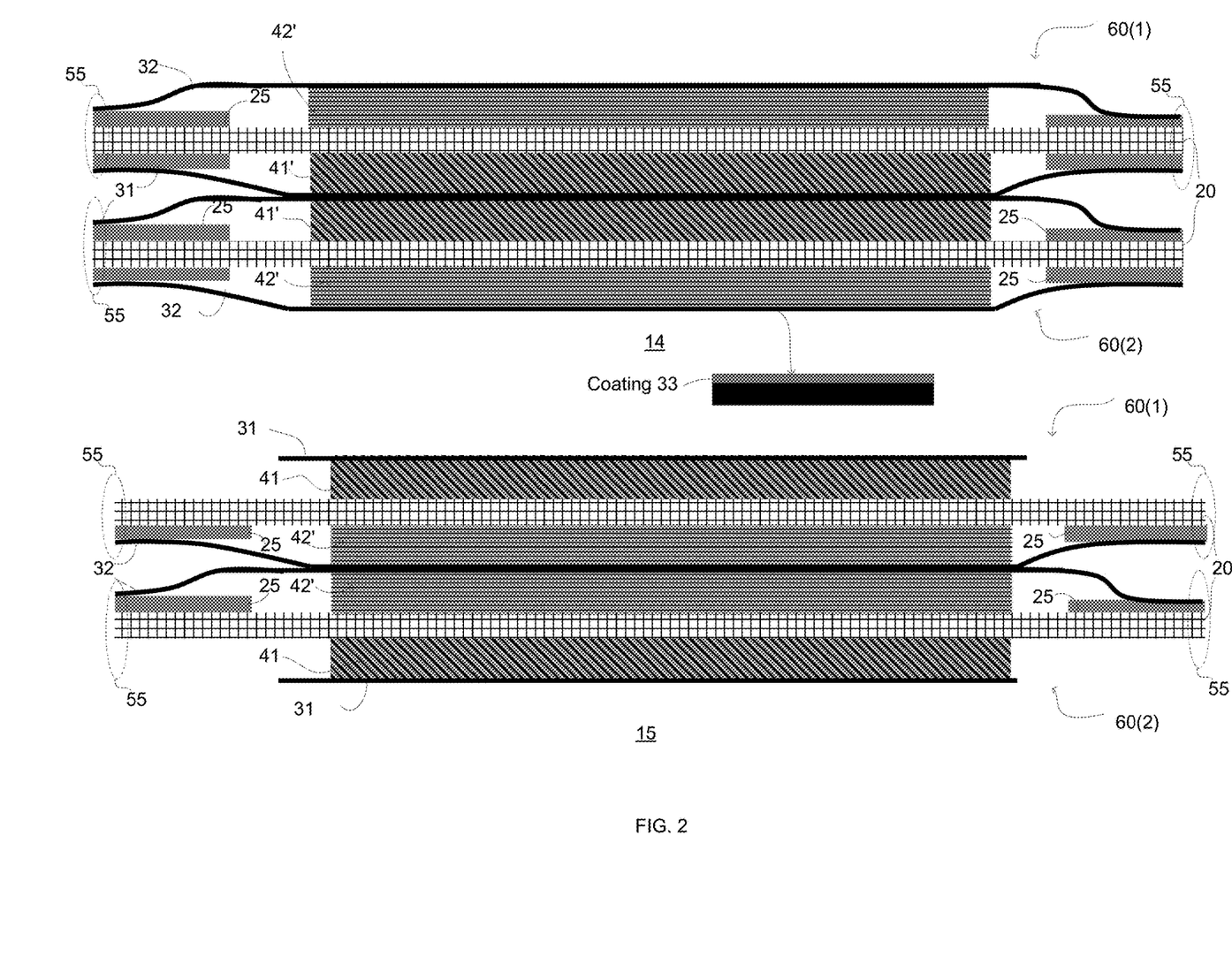
FIG. 2 illustrates examples of multi-electrolyte batteries.

The main body of multi-electrolyte battery 14 includes (from top to bottom) cathode current carrier 32, sealed cathode 42', solid electrolyte 20, sealed anode 41', two anode current curriers 31, sealed anode 41', solid electrolyte 20, sealed cathode 42', and cathode current carrier 32. The sealing couplings 55 are formed on both sides of the main body.

The main body of multi-electrolyte battery 15 includes (from top to bottom) anode current carrier 31, unsealed anode 41, solid electrolyte 20, sealed cathode 42', two cathode current curriers 32, sealed cathode 42', solid electrolyte 20, unsealed anode 41, and anode current carrier 31. The sealing couplings 55 are formed on both sides of the main body.

Figure 3:
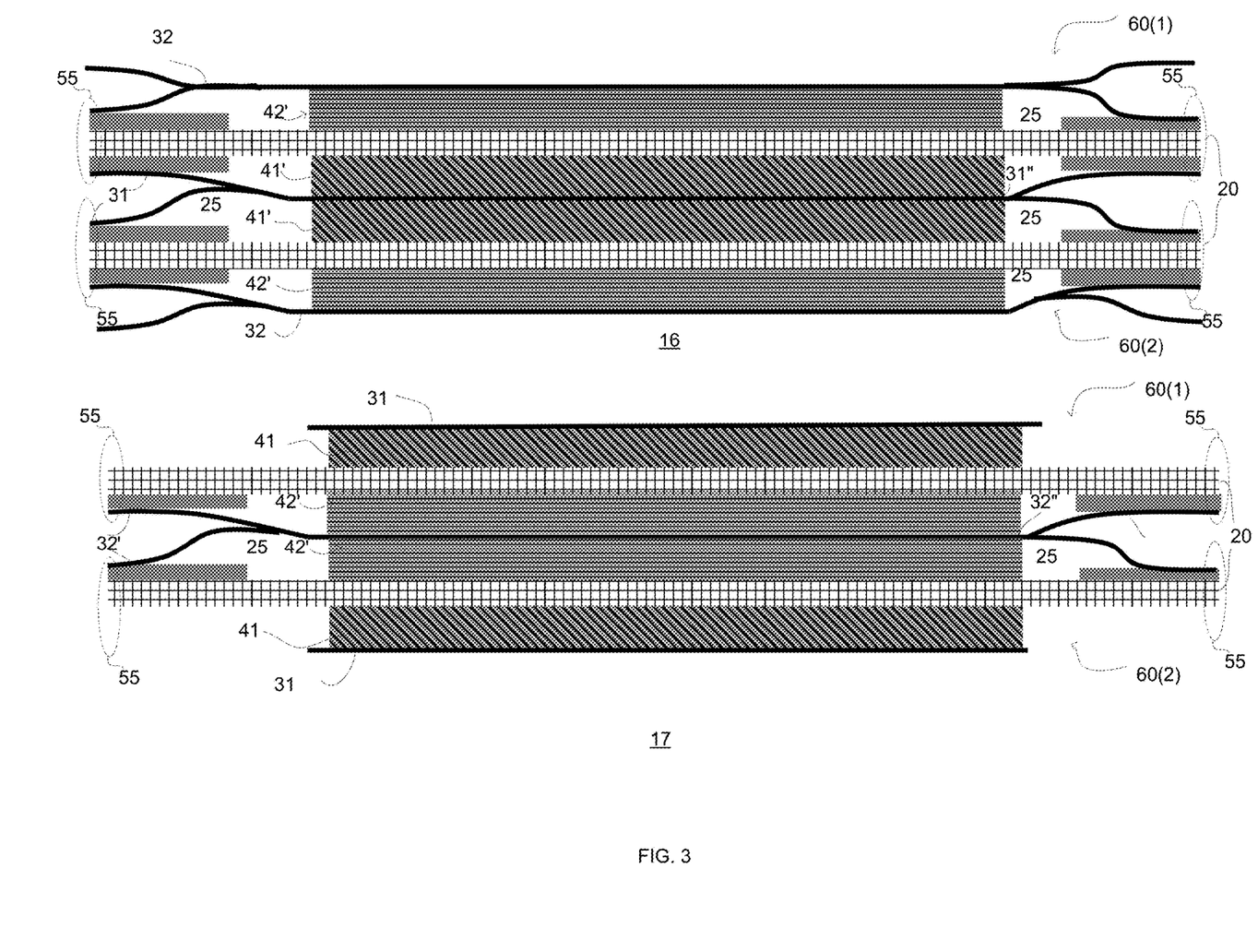
FIG. 3 illustrates examples of multi-electrolyte batteries.

The main body of multi-electrolyte battery 16 includes (from top to bottom) cathode current carrier 32, sealed cathode 42', solid electrolyte 20, sealed anode 41', a shared internal anode current carrier 31", sealed anode 41', solid electrolyte 20, sealed cathode 42', and cathode current carrier 32. The sealing couplings 55 are formed on both sides of the main body.

The main body of multi-electrolyte battery 17 includes (from top to bottom) anode current carrier 31, unsealed anode 41, solid electrolyte 20, sealed cathode 42', a shared internal cathode current currier 32", sealed cathode 42', solid electrolyte 20, unsealed anode 41, and anode current carrier 31. The sealing couplings 55 are formed on both sides of the main body.

Figure 4:
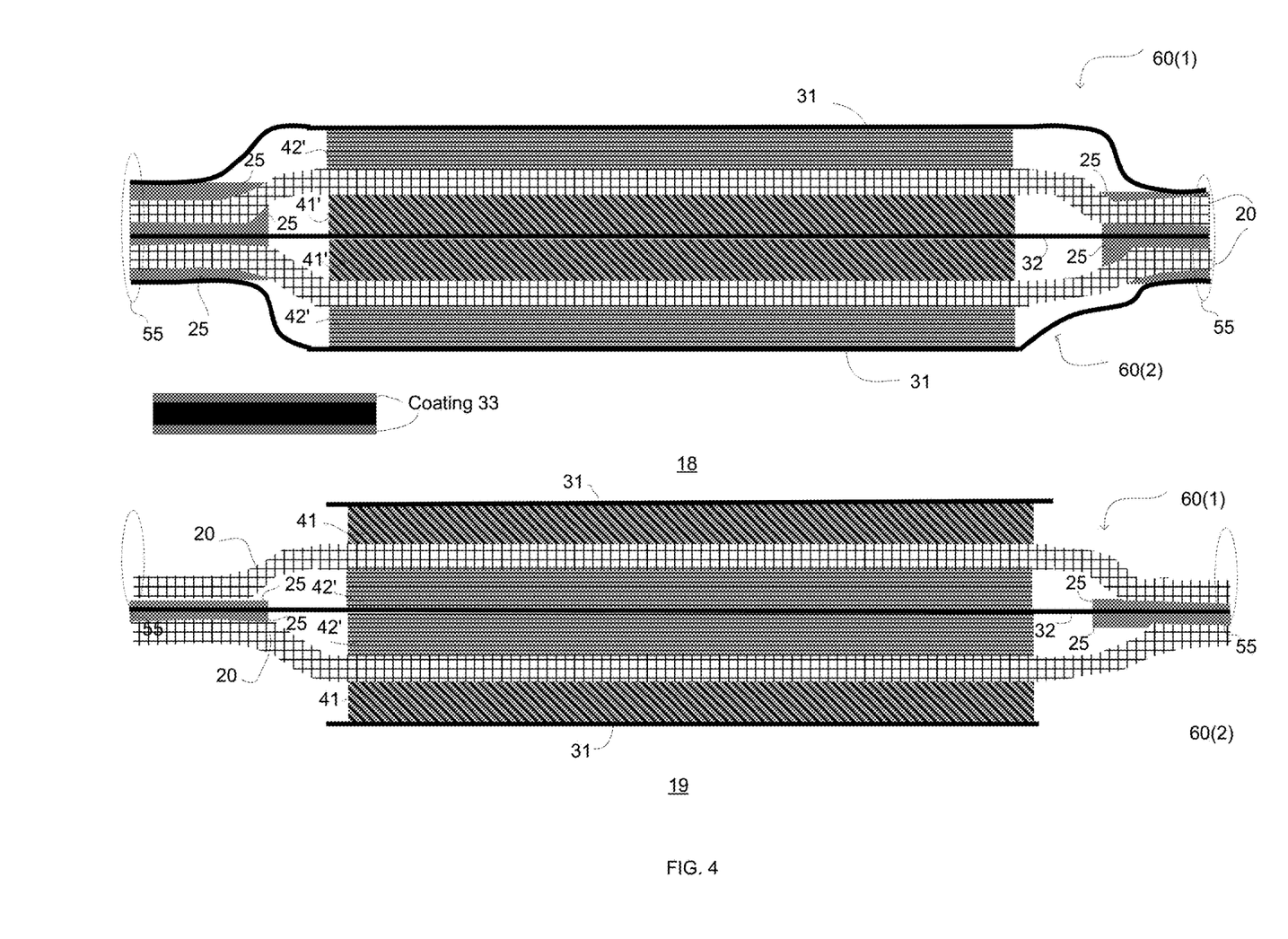
FIG. 4 illustrates examples of multi-electrolyte batteries.

Multi-electrolyte battery 18 differs from multi-electrolyte battery 16 of FIG. 3 by having bent solid electrolytes instead of flat electrolytes. In multi-electrolyte battery 16 there are two distinct sealing couplings on each side—one per segment. In multi-electrolyte battery 18 the two sealing coupling per segments are merged to form one sealing coupling per each side of the main body.

Multi-electrolyte battery 19 differs from multi-electrolyte battery 17 by having bent solid electrolytes instead of flat electrolytes. In multi-electrolyte battery 17 there are two distinct sealing couplings on each side—one per each sealed anode. In multi-electrolyte battery 19 the sealing coupling per anode are merged to form one sealing coupling per each side of the main body.

The current carriers may be coated on one side or on both sides. For example—the current collectors of FIGS. 1 and 2 are single coated—for example coating (see FIG. 2) 33 is deposited on the current collector (31 or 32) 34—and the other side of the current collector is not coated. In battery 16 at least the shared internal anode current currier 31" is double coated. In battery 17 at least the shared internal cathode current currier 32" is double coated. In batteries 16, 17, 18, 19, 13' and 13"—assuming that there are multiple additional segments—then the current curriers that are not the external current carriers of the entire battery are double coated. See for example coating 33 applied on both sides of the current carrier. Yet for another example—even one or more of the external current carriers may be coated.

It should be noted that a battery may be formed in various manners—it may include a spiral (battery 14 of FIG. 7) of layers (current carrier, anode, solid electrolyte, cathode, cathode current carrier), jelly rolled (battery 15' of FIG. 7), and the like.

The batteries of FIGS. 2-4 and 6 may be formed by connected in parallel the different segments, i.e. by electrodes stacking.

Figure 5:
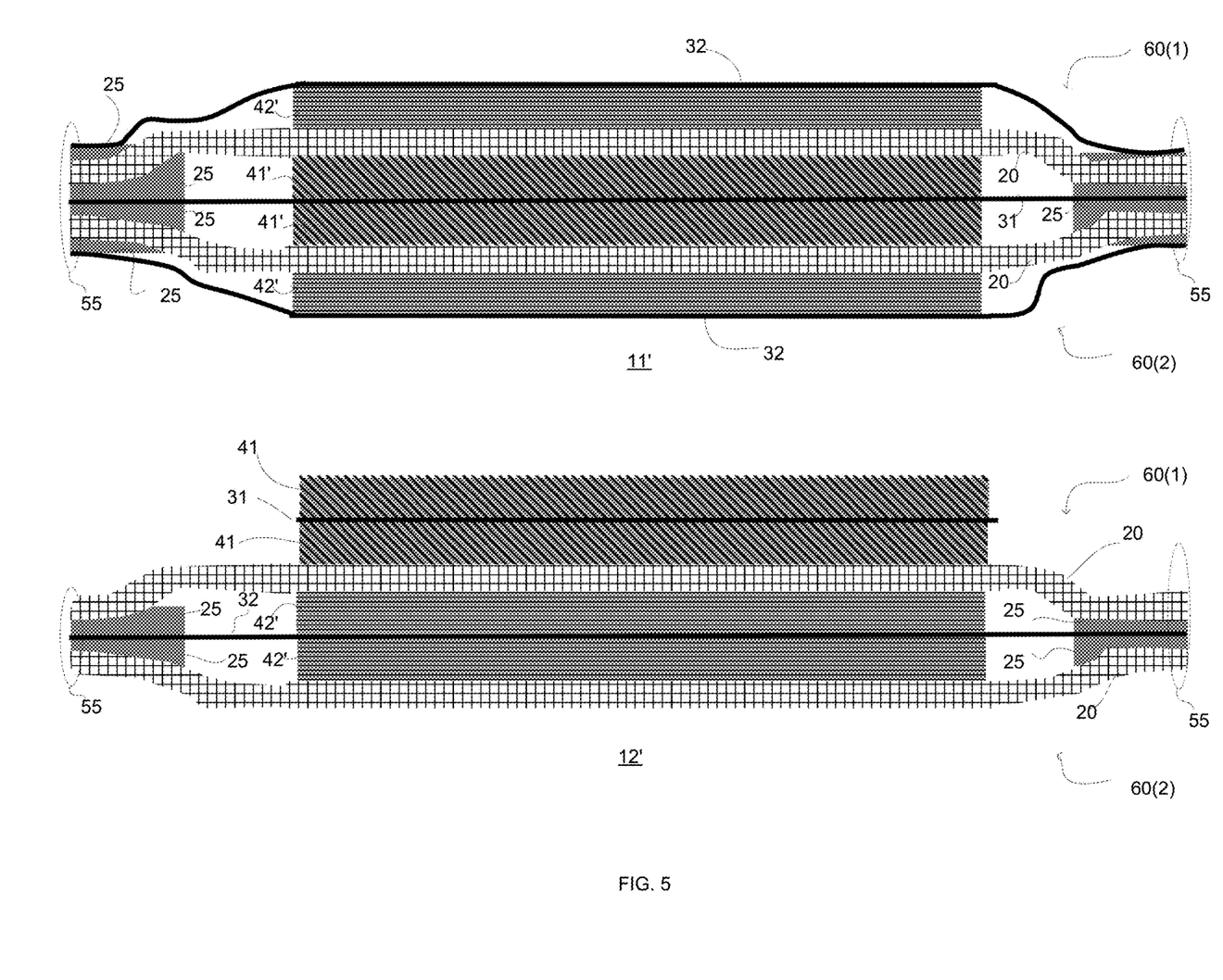
FIG. 5 illustrates examples of multi-electrolyte batteries.
Figure 7:
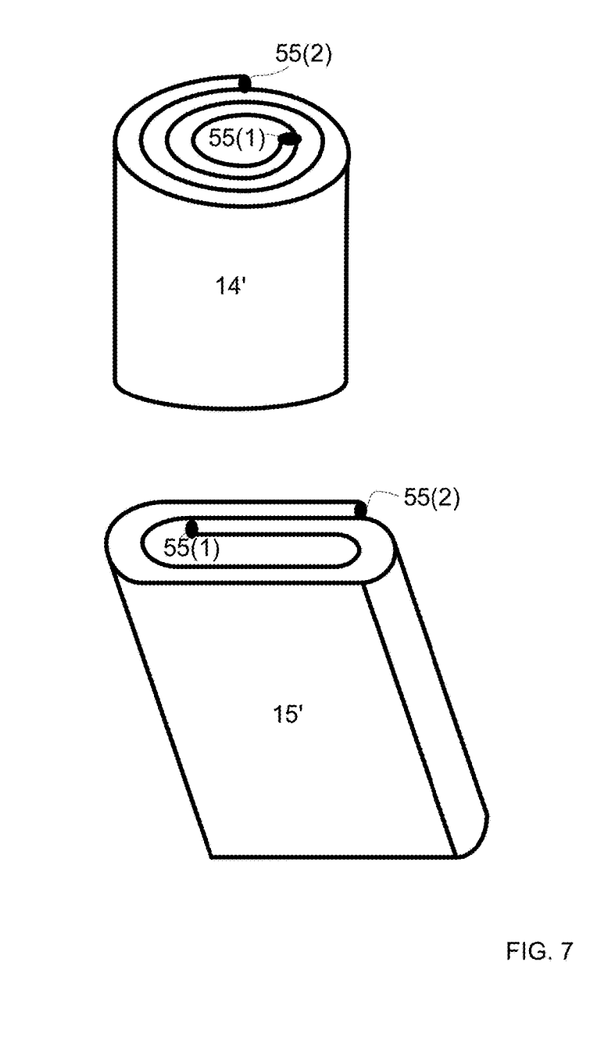
FIG. 7 illustrates examples of batteries.

The batteries of FIG. 5 are illustrated in their un-winded or unrolled form. They are eventually is winded or rolled, (for example without using single electrodes stacking). So, after sealing the "sealed" structure will be rolled or winded (FIG. 7). The sealing coupling that are illustrated in FIG. 5—at the left and the right of the anodes and cathodes—form (after winding or rolling) a sealing coupling at the start of the winding (denoted 55(1) in FIG. 7) and a sealing coupling at the end of the winding (denoted 55(2) in FIG. 7).

Any electrode of any battery may be connected to or may include a terminal or a conductor for connecting the electrode to a circuit outside the battery.

The main body of multi-electrolyte battery 12' includes (from top to bottom) unsealed anode 41, anode current carrier 31, unsealed anode 41, solid electrolyte 20, sealed cathode 42', cathode current currier 32, sealed cathode 42' and solid electrolyte 20. The sealing couplings 55 are formed on both sides of the main body.

Figure 6:
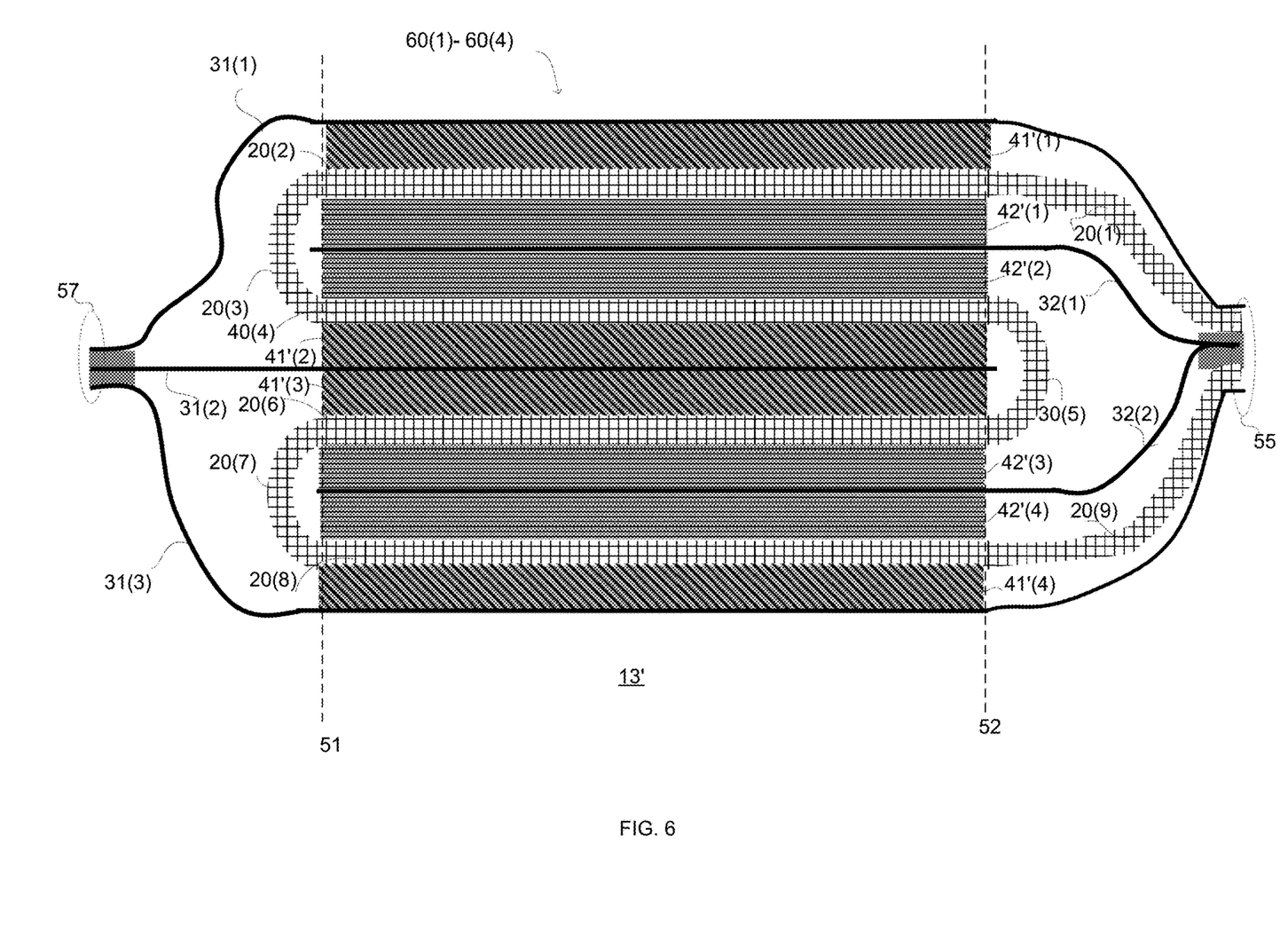
FIG. 6 illustrates an example of a multi-electrolyte battery.
Figure 10:
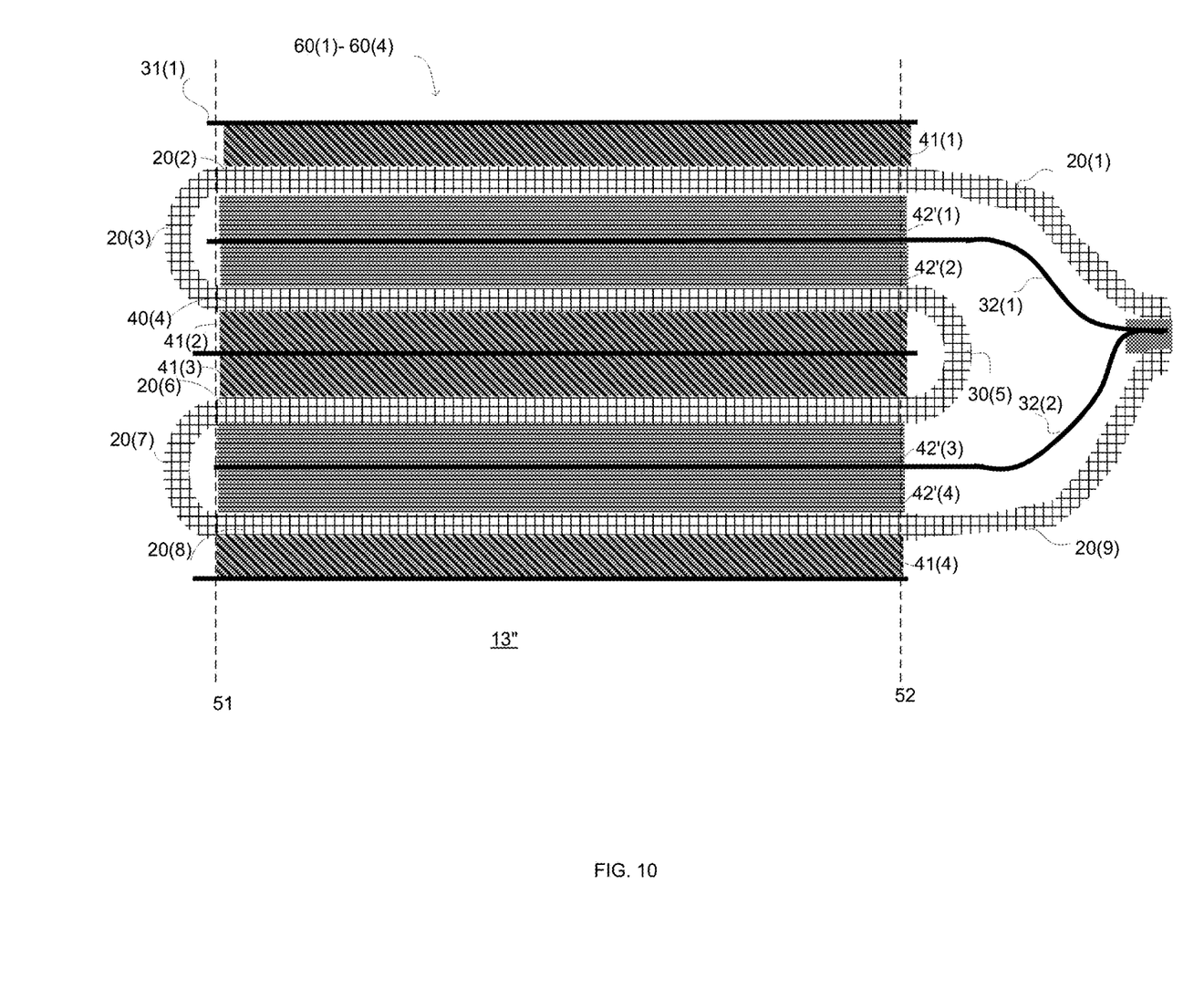
FIG. 10 illustrates an example of a multi-electrolyte battery.

FIG. 6 and FIG. 10 illustrate a multi-electrolyte battery 13' and a multi-electrolyte battery 13"—each includes four segments 60(1)-60(4) and has a solid electrolyte 20 that follows a serpentine path to seal cathodes 42'(1)-42'(4) of a stack of alternating anodes and cathodes. Battery 13' illustrates sealed anodes 41'(1)-41'(4) and cathodes 42'(1)-42'(4). Battery 13" illustrates sealed cathodes 42'(1)-42'(4) and open anodes 41(1)-41(4). In battery 13" there may no sealing coupling such as sealing coupling 57 of battery 13'.

The solid electrolyte includes solid electrolyte internal segments (SEISs) 20(2), 20(4), 20(6) and 20(8), and solid electrolyte external segments (SEESs) 20(1), 20(3), 20(5), 20(7) and 20(9). The segments form a continuous solid electrolyte, whereas SEES 20(1) is followed by SEIS 20(2) that is followed by SEES 20(3) that is followed by SEIS 20(4) that is followed by SEES 20(5) that is followed by SEIS 20(6) that is followed by SEES 20(7) that is followed by SEIS 20(8) that is followed by SEES 20(9).

SEES 20(1), SEES 20(9), cathode current carrier 32(1), cathode carrier 32(2), and heat sensitive resin 25 are sealingly coupled to form the sealing coupling 56—positioned to the right of the main body (delimited between virtual lines 51 and 52).

Anode current carriers 31(1), 31(2) and 31(3) and heat sensitive resin 25 are sealingly coupled to form the sealing coupling 57—positioned to the left of the main body.

The main body of multi-electrolyte battery 13' includes (from top to bottom) anode current carrier 31(1), sealed anode 41'(1), SEIS 20(2), sealed cathode 42'(1), cathode current carrier 32(1), sealed cathode 42'(2), SEIS 20(4), sealed anode 41(2)', anode current carrier 31(2), unsealed anode 41(2), SEIS 20(6), sealed cathode 42'(3), cathode current carrier 32(2), sealed cathode 42'(4), SEIS 20(8), unsealed anode 41(2), and anode current carrier 31(3). It should be noted that when Any battery may include any number of electrodes, any number of current carriers, and the like.

Figure 8:
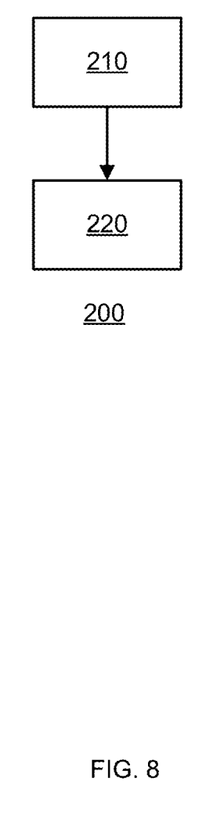
FIG. 8 illustrates an example of a method.
Figure 9:
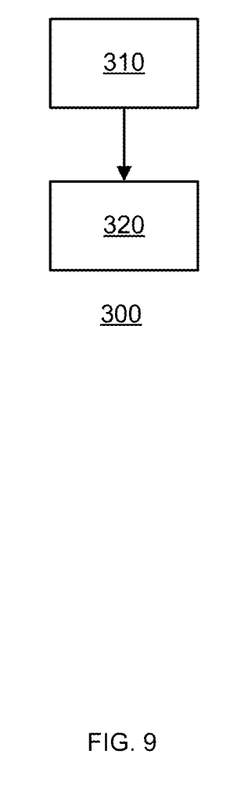
FIG. 9 illustrates an example of a method.

FIGS. 8 and 9 illustrate methods. The refer to a multi-electrolyte battery. This may be any of the multi-electrolyte batteries mentioned in any of the previous figure and/or text.

FIG. 8 illustrates a method 200 for manufacturing a multi-electrolyte battery, the method may include steps 210 and 220.

Step 210 may include providing an anode; a cathode; a solid electrolyte positioned between the anode and the cathode; current carriers that comprises an anode current carrier and a cathode current carrier; and at least one other electrolyte; wherein the anode current carrier and the cathode current carrier comprise two external portions that extends outside the anode.

Step 220 may include sealingly coupling the solid electrolyte to the two external portions of at least one of the current carriers to define at least one sealed electrolyte, the at least one sealed electrolyte belongs to the at least one other electrolyte.

FIG. 9 illustrates a method 300 for operating a multi-electrolyte battery, the method may include steps 310 and 320. Multiple repetitions of steps 310 and 320 may be provided.

Step 310 may include charging the multi-electrolyte battery.

Step 320 may include discharging the multi-electrolyte battery. The multi-electrolyte battery may include an anode; a cathode; a solid electrolyte positioned between the anode and the cathode; current carriers that comprises an anode current carrier and a cathode current carrier; and at least one other electrolyte; wherein the anode current carrier and the cathode current carrier comprise two external portions that extends outside the anode; and wherein the solid electrolyte is sealingly coupled to the two external portions of at least one of the current carriers to define at least one sealed electrolyte, the at least one sealed electrolyte belongs to the at least one other electrolyte.

Materials

For example, anodes may be based, but not limited, on carbon (e.g., graphite, graphene or other carbon-based materials), metalloid anode material such as Si, Ge, Sn and their combinations and/or metals such as Li-metal. Cathodes may comprise, but not limited, lithium metal oxide (LiMeO), wherein Me can be one or several metals selected from Ni, Co, Fe, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc.

In some embodiments, alternatively or complementarily, the formation of SEI on anode(s) may be carried out at least partly using a metal ion source, providing e.g., Li, Mg, Na, $Li^+$, $Mg^{++}$, $Na^+$ and/or other metal atoms and/or ions to participate in SEI formation, sparing at least some of the lithium consumed in the prior art in the formation process.

Solid state electrolyte that is mechanically strong and chemically inert, such as any of inorganic ceramic or/and organic polymeric materials, as well as a combination therof may be used.

For example, $Li_{3x}La_{2/3-x}\square_{1/3-2x}TiO_3$ (LLTOs, perovskite, with x denoting a relative fraction and $\square$ denoting vacancies), $Li_3OCl$ (anti-perovskite), $Li_{14}ZnGe_4O_{16}$ (LiSICON), $Li_{1.3}Ti_{1.7}Al_{0.3}(PO_4)_3$ (NaSICON type), $Li_7La_3Zr_2O_{12}$ (garnet), Thio-LiSICON, $Li_6PS_5X$ (X denoting any of Cl, Br, I), argyrodites, $Li_{10}MP_2S_{12}$, (M denoting any of Ge, Sn), and/or possibly polymeric solid state electrolytes, for example, based on cross linked poly ethylene oxide (e.g., poly(ethylene glycol) dimethacrylate, PEGDMA).

For example, any of the following electrolyte solutions or their combinations may be used in liquid electrolyte for the anode or/and cathode side: ethylene carbonate (EC), diethyl carbonate (DEC), propylene carbonate (PC), fluoroethylene carbonate (FEC), ethyl methyl carbonate (EMC), dimethyl carbonate (DMC), vinylene carbonate (VC), possibly tetrahydrofuran (THF) and/or its derivatives, and combinations thereof. In addition, Sulfolane (tetramethylene sulfone), THF (tetrahydrofuran), HMPA (hexamethylphosphotriamide), CH3CN (acetonitrile), DMF (N,N-dimethylformamide), NMP (N-methylpyrrolidone), [C4mpyrr][NTf2](N-butyl-N-methyl-pyrrolidinium bis(trifluoromethylsulfonyl)imide), DMSO (dimethyl sulfoxide), [P14,6,6,6][NTf2](tris(P-hexyl)tetradecylphosphonium, trifluorotris(pentafluoroethyl)phosphate), [C4mim][PF6](1-butyl-3-methylimidazolium hexafluorophosphate), (H2NCH2)2, [N6,2,2,2][NTf2](N-hexyltriethylammonium bis(trifluoromethylsulfonyl)imide), [C6mim][FAP](1-hexyl-3-methylimidazolium tris(perfluoroethyl)trifluorophosphate), [C4mim][BF4](1-butyl-3-methylimidazolium tetrafluoroborate), [C4mim][OTf](1-butyl-3-methylimidazolium trifluoromethylsulfonate), [C6mim][Cl](1-hexyl-3-methylimidazolium chloride), [C4dmim][NTf2](1-butyl-3-methylimidazolium bis(trifluoromethylsulfonyl)imide), [C4mim][NTf2](1-butyl-3-methylimidazolium bis(trifluoromethylsolfonyl)imide), PC (propylene carbonate), [C2mim][NTf2](1-ethyl-3-methylimidazolium bis(trifluoromethylsulfonyl)imide), [C4mim][I](1-hexyl-3-methylimidazolium iodide), Pyridine, CH3COOH (acetic acid), CH2Cl2 (dichloromethane), HFIP (hexafluoro-2-propanol).

THF, 1,3 dioxolane (1,3 DoL), Dimethoxyethane (DME), Diethylene glycol dimethyl ether (diglyme), Triethylene glycol dimethyl ether (triglyme), Tetraethylene glycol dimethyl ether "tetraglyme", Hexane, 2-MeTHF, Tetramethyltetrahydrofuran (TMTHF), Diethyl ether, Dibutyl ether (DBE), Di-pentyl ether (DPE), Cyclopentyl methyl ether (CPME), 1-ethyl-3-methyl imidazolium (EMI), Hexamethelphosphoric triamide (HMPA), Tetrahydrothiophene, as well as various poly-ethers such as DME and di-, tri- and tetra-glyme. Additives such as any of N,N-dimethyl-Benzenamine, 5-dimethyl-Furan, N,N-diethyl-1,1,1-trimethyl-Silanamine, 1,4-bis(1,1-dimethylethyl)-2,5-dimethoxy-Benzene, 1,4-Benzodioxin-6,7-diol, 2,3-dihydro and/or 10H-Phe-nothiazine, 10-phenyl may also be used.

In certain embodiments, the following lithium salts may be used: $LiPF_6$, $LiClO_4$, LiFSI, LiTFSI, LiTDI, LiBOB and LiFOB. In various embodiments, any of RAFTs (reversible addition fragmentation chain transfer agents), Di-Phenyls-Si/SE and Thianthrene may be used as additives. Any of the additives disclosed in U.S. patent application Ser. Nos. 16/291,031 and 16/525,627, incorporated herein by reference in their entirety, may be used as additive in liquid electrolyte.

The listed solvents, ions of the respective ionic liquids and poly-ethers, are illustrated below (DME denotes 1,2-dimethoxyetane, Diglyme denotes diethylene glycol dimethyl ether, Triglyme denotes triethylene glycol dimethyl ether, Tetraglyme denotes tetraethylene glycol dimethyl ether, and DEE denotes 1,2-diethoxyetane):

-continued

Triglyme

Tetraglyme

DEE

Non-limiting examples for disclosed electrolyte solutions comprise any of the following:
- Sulfolane solution, with LiTFSI (lithium bis(trifluoromethanesulfonyl)imide);
- Sulfolane solution, with LiBOB (lithium bis(oxalato)borate);
- Sulfolane solution, with LiTFSI+LiPF$_6$;
- Sulfolane:Triglyme solution, with LiTFSI and LiBOB;
- Sulfolane:Triglyme solution, with LiTFSI;
- NMP with LiTFSI;
- NMP: Sulfolane solution, with LiTFSI;
- DME: Sulfolane solution, with LiTFSI+LiFOB (lithium difluoro(oxalato)borate); and/or
- Tetraglyme: Sulfolane solution, with LiTFSI; and 1,2-diethoxyethane (DEE).

A range of additives may be added to any of the disclosed electrolyte solutions, to support SEI formation on the cathode. The additives are noted together with their oxidation potentials compared to Li/Li$^+$, which are all close to the cathode potential.

N,N-dimethyl-Benzenamine
ca. 3.7V 2,5-dimethyl-Furan
ca. 4.2V

N,N-diethyl-1,1,1-trimethyl-Silanamine
ca. 3.9V 1,4-bis(1,1-dimethylethyl)-2,5-dimethoxy-Benzene
Ca. 3.85V 1,4-Benzodioxin-6,7-diol, 2,3-dihydro
ca. 3.85V 10H-Phenothiazine, 10-phenyl
ca. 3.5V While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A multi-electrolyte battery, comprising:
   an anode;
   a cathode;
   a solid electrolyte positioned between the anode and the cathode;
   current carriers that comprises an anode current carrier and a cathode current carrier; and
   at least one other electrolyte;
   a first sealing coupling positioned at a first end of the multi-electrolyte battery and is configured to seal the electrolyte;
   a second sealing coupling positioned at a second end of the multi-electrolyte battery and is configured to seal the electrolyte;
   wherein a current carrier selected from the anode current carrier and the cathode current carrier comprises a current collector main portion, a first current carrier external portion, and a second current carrier external portion; wherein the current carrier main portion is located between the first current carrier external portion and the second current carrier external portion;
   wherein the current carrier main portion is parallel to the solid electrolyte;
   wherein the first current carrier external portion and the second current carrier external portion are bent towards the solid electrolyte;
   wherein the first sealing coupling comprises a distal end of the first current carrier external portion and a distal end of the solid electrolyte;
   wherein the second sealing coupling comprises a distal end of the second current carrier external portion and a second distal end of the solid electrolyte.

2. The multi-electrolyte battery according to claim 1 wherein each one of the first sealing coupling and the second sealing coupling further comprises a heat responsive resin.

3. The multi-electrolyte battery according to claim 1 that consists essentially of the anode, the cathode, the solid electrolyte, the al least one other electrolyte, the first sealing coupling, the second sealing coupling, the anode current carrier, and the cathode current carrier.

4. The multi-electrolyte battery according to claim 1 wherein the anode current carrier comprises an anode current collector main portion, an anode first current carrier external portion, and an anode second current carrier external portion, wherein the anode current carrier main portion is parallel to the solid electrolyte; wherein the anode first current carrier external portion and the anode second current carrier external portion are bent towards the solid electrolyte; and wherein the cathode current carrier comprises a cathode current collector main portion, a cathode first current carrier external portion, and a cathode second current carrier external portion; wherein the cathode current carrier main portion is parallel to the solid electrolyte; wherein the cathode first current carrier external portion and the cathode second current carrier external portion are bent towards the solid electrolyte.

5. The multi-electrolyte battery according to claim 4 wherein a distance between the cathode current collector main portion and the anode current collector main portion exceeds a width of the first sealing coupling.

6. The multi-electrolyte battery according to claim 1 wherein the at least one sealed electrolyte comprises a liquid electrolyte.

7. The multi-electrolyte battery according to claim 1 wherein the at least one sealed electrolyte comprises a solid electrolyte.

8. The multi-electrolyte battery according to claim 1 wherein the at least one other electrolyte comprises other electrolytes that differ from each other.

9. The multi-electrolyte battery according to claim 1 wherein the solid electrolyte is flat.

10. The multi-electrolyte battery according to claim 1 wherein the solid electrolyte is bent.

11. The multi-electrolyte battery according to claim 1 comprising multiple segments, wherein each segment comprises the anode, the cathode, the solid electrolyte, the current carriers and the at least one other electrolyte.

12. The multi-electrolyte battery according to claim 11 wherein the multiple segments are stacked.

13. The multi-electrolyte battery according to claim 11 wherein a current carrier of one segment and a current carrier of an adjacent segment share at least one portion.

14. The multi-electrolyte battery according to claim 11 wherein solid electrolytes of two or more segments are parallel to each other.

15. The multi-electrolyte battery according to claim 11 wherein a pair of solid electrolytes of two adjacent segments are sealingly coupled to opposite sides of a current carrier shared by the two adjacent segments.

16. The multi-electrolyte battery according to claim 11 wherein all other electrolytes of all segments are sealed.

17. The multi-electrolyte battery according to claim 11 wherein some of the other electrolytes of all segments are unsealed.

18. The multi-electrolyte battery according to claim 11 wherein the solid electrolyte of each segment is sealingly coupled to two external portions of at least one of the current carriers of the segment to define at least one sealed electrolyte of the segment.

19. The multi-electrolyte battery according to claim 1 wherein the battery is made of winded layers.

20. The multi-electrolyte battery according to claim 1 wherein the current carrier selected from the anode current carrier and the cathode current carrier is the anode current carrier and wherein the cathode current carrier consists essentially of a cathode current collector main portion that is parallel to the solid electrolyte.

21. The multi-electrolyte battery according to claim 1 wherein the current carrier selected from the anode current carrier and the cathode current carrier is the cathode anode current carrier and wherein the anode current carrier consists essentially of a anode current collector main portion that is parallel to the solid electrolyte.

22. A multi-electrolyte battery, comprising:
anodes;
cathodes;
a solid electrolyte that comprises internal segments and external segments;
current carriers that comprise anode current carriers and cathode current carriers;
other electrolytes;
wherein different internal segments are positioned between different pairs of an anode and a cathode and are parallel to each other;
wherein some external segments are curved, have a U-shape, and are connected between the different internal segments;
wherein some other external segments are curved and are sealingly coupled to some of the current collectors;
wherein the some of the current collectors comprise a given current collector that comprises (i) a two given current carrier external portions that extends outside the anode, and (ii) given current carrier main portion that is located between the two given current carrier external portions; and
wherein some other current collectors are sealingly coupled to each other.

23. The multi-electrolyte battery according to claim 22 wherein the some other external segments are sealingly coupled to some of the current collectors at one side of the anodes; and the some other current collectors are sealingly coupled to each other at a second side of the anodes.

24. The multi-electrolyte battery according to claim 22 wherein the some other external segments are sealingly coupled to some of the current collectors by a heat responsive resin, and wherein the some other current collectors are sealingly coupled to each other at a second side of the anodes by the heat responsive resin.

* * * * *